UNITED STATES PATENT OFFICE.

ERNST GRETHER, OF DETROIT, MICHIGAN, ASSIGNOR, BY MESNE ASSIGNMENTS, TO ADAM BETZING, OF DETROIT, MICHIGAN.

3.4-DIOXYPHENYLGLYOXIMS AND PROCESS OF PREPARING SAME.

1,051,578. Specification of Letters Patent. Patented Jan. 28, 1913.

No Drawing. Application filed July 16, 1906, Serial No. 326,300. Renewed January 17, 1912. Serial No. 671,565.

*To all whom it may concern:*

Be it known that I, ERNST GRETHER, a subject of the Emperor of Germany, residing at Detroit, in the county of Wayne and State of Michigan, have invented certain new and useful Improvements in 3.4-Dioxyphenylglyoxims and Processes of Preparing the Same, of which the following is a specification.

This invention relates to an improvement in processes for the production of certain oxims which may be designated as 3.4-dioxyphenylglyoxims.

By treating the 3.4-dioxyphenylhalogenalkylketone represented by the chemical formula

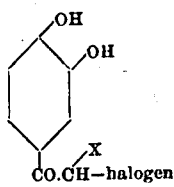

wherein X represents either an alkyl or a hydrogen atom with hydroxylamin—preferably with an excess thereof and with the application of heat—new products are obtained the chemical formula of which may be given as

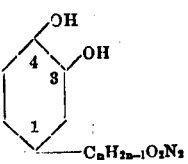

in which the dioxyphenyl group is attached to a carbon atom of the glyoxim nucleus. These new products serve as the primary source for the production of valuable therapeutic compounds which possess blood raising properties as will be found more fully described in a concurrent application Serial No. 326,301.

The following examples more specifically illustrate how the invention may be practised:

1. To produce 3.4-dioxyphenylglyoxims, 100 g. chloropyrocatechin (see Dzierzgowski, *Berichte*, Referate Bd. 26, 588 and Bd. 27, 1983) are heated to about 70–75° C. for 3 to 4 hours with a solution of 148 g. of hydroxylamin-hydrochlorid and 98 g. calcined sodium carbonate in 560 g. water. The crystallized product is removed from the liquor the next day and washed out with a small quantity of water. From the mother liquor the remainder is obtained by extraction with ether. The product is then purified by re-crystallization from water to which animal charcoal has been added. A further purification of the product can be obtained by recrystallization from acetone+ ligroin or acetic ether plus ligroin. The product thus obtained darkens by subjecting it to a temperature of 150° C. and melts and decomposes at about 170° C. without a sharply defined melting point. In its pure state it forms small white needles which in aqueous solution exposed to the air acquires a darker color. With ferric chlorid a diluted aqueous solution gives an intense green color. The product is slightly soluble in cold water, more so in hot water, easily soluble in alcohol and almost insoluble in petrol ether. The result of the analysis made of the new compound and the calculated amounts are as follows:

| Calculated. | Found I. | Found II. |
|---|---|---|
| N = 14.14% | 13.75% | 14.19% |
| C = 48.48% | 48.22% | |
| H = 5.31% | 5.76% | | which agrees with the formula $C_8H_{10}N_2O_4$.

2. If in the foregoing example the chloracetopyrocatechin is replaced by bromacetopyrocatechin (see *Berichte* Bd. 26 Referate 588) the result will be the same as above with the separation of hydroxylamin hydrobromid.

3. For the production of 3.4-dioxyphenylmethylglyoxim 75 g. chlorpropiopyrocatechin (see *Berichte*, Referate Bd. 26, 588) or the equivalent amount of brompropiopyrocatechin together with a solution of 110 g. hydroxylaminhydrochlorid and 73 g. calcined sodium carbonate in 420 g. water are heated to about 70–75° C. for 3 to 4 hours. The separation and purification is analogous to Example 1.

The dioxims thus obtained form white needles and have the same characteristics in regard to solubility and color reaction as given for the one in Example 1 with a melting point of from 201° to 202° C.

What I claim is:—

1. The herein described process of producing 3.4-dioxyphenylglyoxims which consists in subjecting the 3.4-dioxyphenylhalogenalkylketones in watery solution to the action of hydroxylamin-hydrochlorid in connection with sodium carbonate and under application of heat, and thence isolating the product from the solution, substantially as described.

2. As new products the 3.4-dioxyphenyl-glyoxims corresponding to the formula

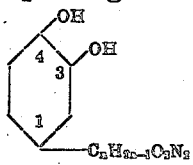

in which the dioxyphenyl group is attached to a carbon atom of the glyoxim nucleus, the same crystallizing in the form of white needles, soluble in water, more so in hot water and easily soluble in alcohol, almost insoluble in petrol ether, tasteless, and giving an intense green color reaction with ferric chlorid in an aqueous solution, said products by reduction being transformable into substances having blood raising properties.

In testimony whereof I affix my signature in presence of two witnesses.

ERNST GRETHER.

Witnesses:
  OTTO F. BARTHEL,
  CHAS. B. SHUMWAY.